United States Patent
Michaud

(10) Patent No.: US 12,493,424 B2
(45) Date of Patent: Dec. 9, 2025

(54) DISTRIBUTED FABRIC LOGICAL BLOCK ADDRESSING

(71) Applicant: Dell Products L.P., Round Rock, TX (US)

(72) Inventor: Adrian Michaud, Carlisle, MA (US)

(73) Assignee: Dell Products L.P., Round Rock, TX (US)

( * ) Notice: Subject to any disclaimer, the term of this patent is extended or adjusted under 35 U.S.C. 154(b) by 3 days.

(21) Appl. No.: 18/644,254

(22) Filed: Apr. 24, 2024

(65) Prior Publication Data

US 2025/0335112 A1 Oct. 30, 2025

(51) Int. Cl.
*G06F 3/06* (2006.01)

(52) U.S. Cl.
CPC ............ *G06F 3/064* (2013.01); *G06F 3/0604* (2013.01); *G06F 3/0673* (2013.01)

(58) Field of Classification Search
None
See application file for complete search history.

(56) References Cited

U.S. PATENT DOCUMENTS

2019/0332544 A1* 10/2019 Jia .................... G06F 12/1045

* cited by examiner

*Primary Examiner* — Brian R Peugh
(74) *Attorney, Agent, or Firm* — Chamberlain, Hrdlicka, White, Williams & Aughtry; Aly Z. Dossa

(57) ABSTRACT

A system for managing storage and access to data for a file system includes a client device, a file system server, and a storage device. The file system server may perform a method that includes receiving a request for a file system object from the client device, wherein the request comprises a logical block address (LBA) associated with a data block of the file system object. The LBA includes a storage device index corresponding to the storage device, a block size index corresponding to a size of the data block, and a block number corresponding to a block index of a plurality of data blocks stored in the storage device. In response to the request: the method further includes determining a storage location of the data block using the LBA, obtaining data associated with the data block from the storage device, and providing the data to the client device.

20 Claims, 9 Drawing Sheets

| Data Block | Storage Device Index | Block Size Index | Block Number |
|---|---|---|---|
| 1 | 0 | 6 | 2934 |
| 2 | 0 | 6 | 30934 |
| 3 | 2 | 6 | 235 |
| 4 | 1 | 6 | 33356 |
| 5 | 3 | 0 | 23543 |
| 6 | 3 | 0 | 54556 |
| 7 | 1 | 0 | 332325 |
| 8 | 4 | 0 | 549324 |

FIG. 4A

| Block Size Index | Block Size |
|---|---|
| 0 | 4K |
| 1 | 8K |
| 2 | 16K |
| 3 | 32K |
| 4 | 64K |
| 5 | 128K |
| 6 | 256K |
| ... | ... |
| 30 | 4TB |
| 31 | 8TB |

FIG. 4B

| Storage Device Index | Internet Protocol (IP) Address | Remote Direct Memory Registered Identifier | Unique Registration Identifier | Replication Storage Device Index |
|---|---|---|---|---|
| 0 | 10.1.1.31 | 0x6901348766204865 | 0x6994133 | 7 |
| 1 | 10.1.1.12 | 0x6569092142684565 | 0x6546871 | 6 |
| 2 | 10.1.1.17 | 0x7892698629807212 | 0x6486513 | 5 |
| 3 | 10.1.1.29 | 0x9771266959974426 | 0x9782186 | 4 |
| 4 | 10.1.1.95 | 0x3669458789412365 | 0x8559810 | None |
| 5 | 10.1.1.96 | 0x4448755684684357 | 0x5255943 | None |
| 6 | 10.1.1.85 | 0x1021064909905905 | 0x9887203 | None |
| 7 | 10.1.1.73 | 0x6901348766204865 | 0x5998123 | None |
| ... | ... | ... | | |

FIG. 4C

DISTRIBUTED FABRIC LOGICAL BLOCK ADDRESSING

BACKGROUND

Computing devices may include any number of internal components such as processors, memory, and persistent storage. Each of the internal components of a computing device may be used to generate data. The process of generating, storing, and transferring data across a system of devices may utilize resources of the computing devices such as processing and storage. The utilization of the aforementioned resources to generate, store, and transfer data may impact the overall performance of the resources. File systems may use network capabilities and processing capabilities to read requests for files and/or other directories.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIGS. 4A-4C show an example in accordance with one or more embodiments of the invention.

DETAILED DESCRIPTION

Figure 1A:
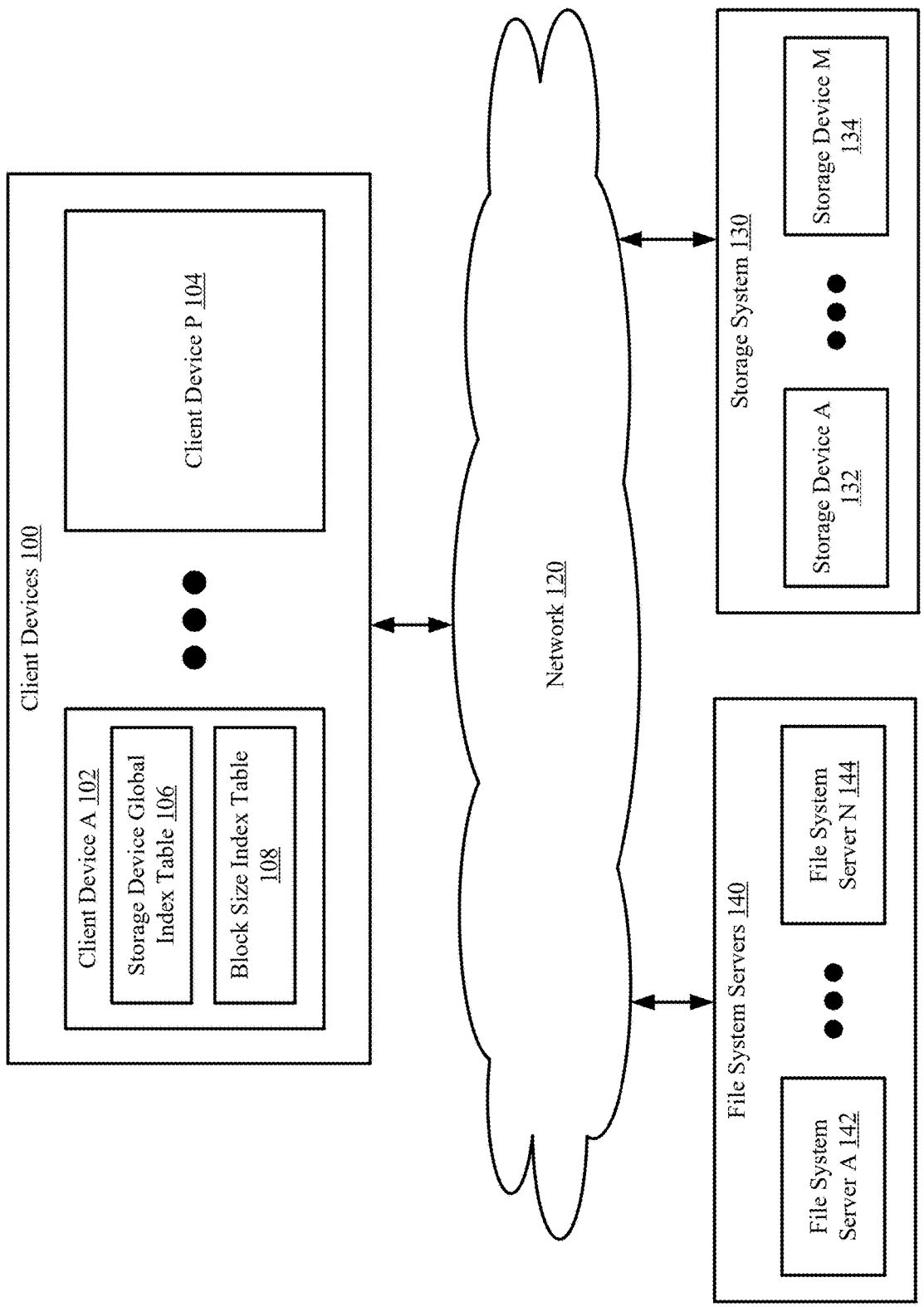
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details, and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this disclosure, elements of figures may be labeled as A to N, A to P, A to M, or A to L. As used herein, the aforementioned labeling means that the element may include any number of items, and does not require that the element include the same number of elements as any other item labeled as A to N, A to P, A to M, or A to L. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, operably connected, or operative connection, means that there exists between elements, components, and/or devices a direct or indirect connection that allows the elements to interact with one another in some way. For example, the phrase 'operably connected' may refer to any direct (e.g., wired directly between two devices or components) or indirect (e.g., wired and/or wireless connections between any number of devices or components connecting the operably connected devices) connection. Thus, any path through which information may travel may be considered an operable connection.

In general, embodiments of the invention may relate to a method and system for managing metadata. Embodiments of the invention may include a new logical block address (LBA) encoding scheme, methods for distribution, disaggregation, and encoding method for storing and accessing files in the file systems. In one or more embodiments disclosed herein, a LBA is a data structure that uniquely identifies a data block of a file. The LBA discussed throughout this disclosure may be encoded with at least metadata used for locating the storage of the data block. The LBA may be encoded with, for example, a storage device index corresponding to a storage device in a system, a block size index corresponding to a size of the data blocks, and a block number of the storage device.

Embodiments disclosed herein provide methods and systems for generating the LBAs based on the generation of data blocks, the sizing, and the storage of the data blocks in a storage system of multiple storage devices. File system servers in the system may include functionality for performing the data block storage and the LBA generation for each data block. Further, the file system servers, or client devices, may include functionality for accessing the data blocks using the encoding of the LBAs. Said another way, the device obtaining a file using the corresponding LBAs may use the encoded storage device index, block size index, and block number to access each data block of the file from the storage system.

Various embodiments of the invention are described below.

FIG. 1A shows an example system in accordance with one or more embodiments of the invention. The system includes one or more client devices (100), a storage system (130) that includes one or more storage devices (132, 134), a set of two or more file system servers (140), and a network (120) operatively connected to each of the client devices (100), the file system servers (142, 144), and the storage system (130). The components in the system may be operably connected via any combination of wired and/or wireless connections. The system may include additional, fewer, and/or different components without departing from the invention. Each component in the system is operably connected via any combination of wired and/or wireless connections.

In one or more embodiments disclosed herein, the client devices (100) provide services to users operating the client devices (100). The services may be provided using applications executing on the client devices (100). The applications may be logical entities executed using computing resources (not shown) of the client devices (102, 104). Each of the applications may be performing similar or different processes. In one or more embodiments disclosed herein, the applications provide services to the client devices. For example, the applications may host components. The components may be, for example, instances of databases, email servers, operating systems, and/or other components. The applications may host other types of components without departing from the invention. An application may execute on one or more client devices (e.g., 102, 104) as instances of the application. The applications may utilize data stored in memory. The applications may utilize data stored in the storage system (130) and/or in the file system servers (140). The client devices (100) may access such data using a connection to the file system servers (140) via the network (120).

In one or more embodiments, each client device (102, 104) stores a storage device global index table (106) and a block size index table (108). In one or more embodiments, the storage device global index table is a data structure that maps storage device indices of logical block addresses (LBAs) (further discussed in FIG. 2A) to corresponding storage devices. For additional details regarding the storage device global index table, refer to FIGS. 2B and 4C. In one or more embodiments, the block size index table (108) is a data structure that maps each block size index to a corresponding data block size. For example, a block size index of 0 may be mapped to a data block size of 4 kilobytes (KB), and a second block size index of 1 may be mapped to a data block size of 8 KB. For additional details regarding to the data block size index, refer to FIG. 4B.

Figure 5:
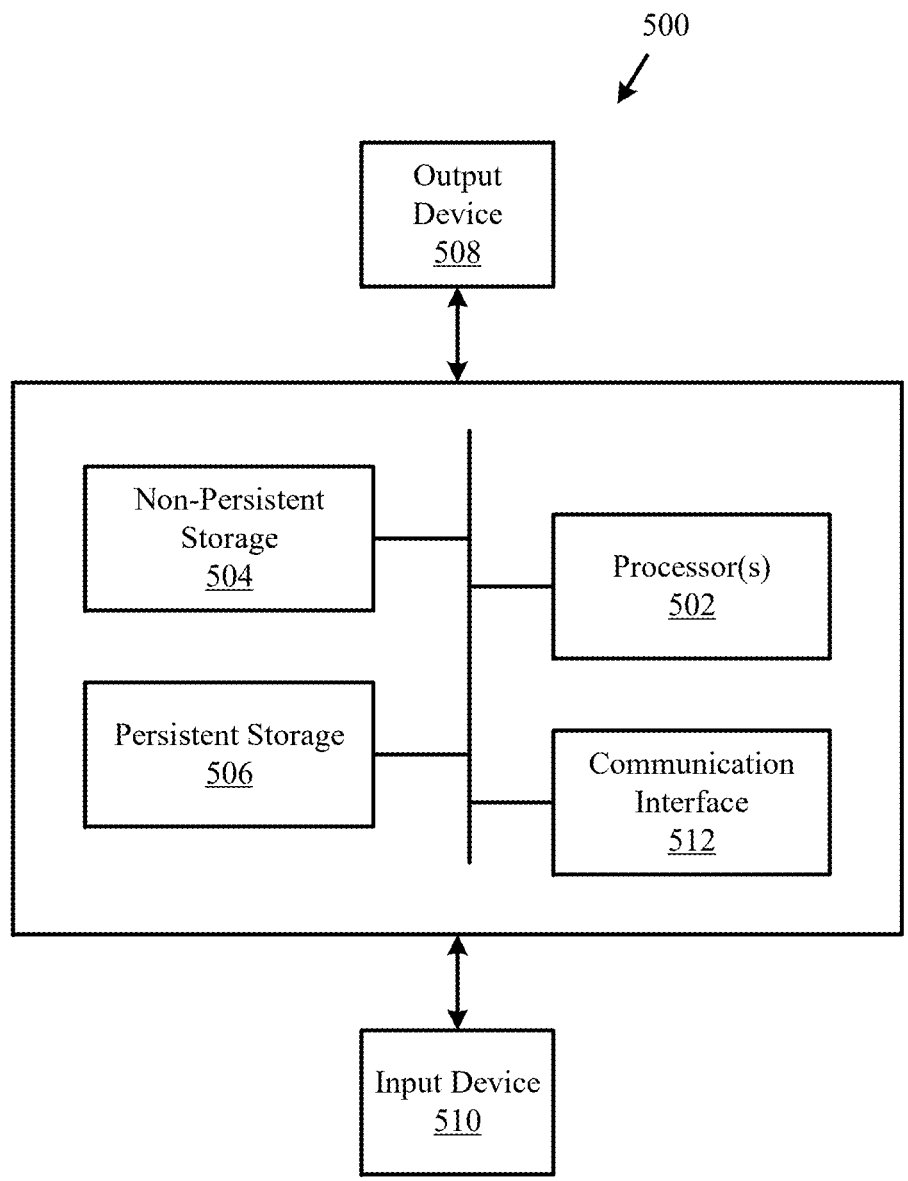
FIG. 5 shows a diagram of a computing device in accordance with one or more embodiments of the invention.

In one or more embodiments, each of the client devices (102, 104) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client device (102, 104) described throughout this application.

In one or more embodiments disclosed herein, one or more of the client devices (102, 104) is implemented as a logical device. The logical device may utilize the computing resources of any number of computing devices and thereby provide the functionality of the client device (102, 104) described throughout this application.

In one or more embodiments disclosed herein, the network (120) includes one or more network devices operatively connected to at least one of the client devices (102, 104) and one or more of the storage devices (132, 134) of the storage system (130). In one or more embodiments, the network (120) includes functionality for providing access to data in the storage system (130) as requested by the client devices (100) and/or the file system servers (140). The network devices may access the data from the memory devices of the storage devices (132, 134). For example, the network devices may access the memory devices using remote direct memory access (RDMA). In one or more embodiments disclosed herein, RDMA is a mechanism for directly accessing memory stored in a remote location (e.g., in the storage system (130)). In such embodiments, the network devices may be RDMA fabric devices. One or more RDMA fabric devices may access the storage devices (132, 134) without departing from the invention.

In one or more embodiments disclosed herein, the file system servers (140) manage a file system. A file system may refer to an organization of files, directories, and/or other file system objects based on a hierarchical structure. The hierarchical structure may include a root directory that is a parent directory for one or more file system objects such as other directories, other files, and/or other types of file system objects. Each of the other directories may be parent directories for additional file system objects, etc. such that each file system object is associated with a parent directory.

In one or more embodiments disclosed herein, each file system server (142, 144) manages one or more file system objects (not shown). The file system objects managed by each file system server (142, 144) may be a portion of all the file system objects in the file system. In this manner, collectively, all file system servers (140) manage all file system objects in the file system. Further, multiple file system servers (142, 144) may manage one or more file system objects. Said another way, a file system object may be managed by one or multiple file system servers (142, 144).

Each file system object may be associated with one or more data blocks. Each data block may correspond to a LBA. As discussed above, LBA may refer to a data structure used in the file systems for storing, retrieving data and/or metadata information associated with a data block of a file system object (e.g., directories, files, etc.). Each file system object may be identified with a unique numerical sequence. The unique numerical sequence may be encoded with metadata such as, for example, a storage device index, a block size index, and a block number. For additional details regarding the LBA, refer to FIG. 2A. The generation, distribution, and disaggregation of file system objects using LBAs may be performed in accordance with, for example, the methods of FIGS. 3A-3B.

In one or more embodiments disclosed herein, each of the file system servers (142, 144) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the file system servers (142, 144) described throughout this application.

In one or more embodiments disclosed herein, one or more of the file system servers (142, 144) is implemented as a logical device. The logical device may utilize the computing resources of any number of computing devices and thereby provide the functionality of the file system servers (142, 144) described throughout this application. For additional details regarding a file system server (142, 144), refer to, e.g., FIG. 1C.

In one or more embodiments disclosed herein, the storage system (130) is a system used for storing data associated with a file system managed by the file system servers (140). The storage system (130) may include any number of storage devices (132, 134). Each storage device (132) may store a portion of persistent or non-persistent storage that, collectively for all portions of memory, include the memory used by the file system servers (140) to store data for the applications of the client devices (100).

In one or more embodiments disclosed herein, each of the storage devices (132, 134) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the storage devices (132, 134) described throughout this application.

In one or more embodiments disclosed herein, one or more of the storage devices (132, 134) is implemented as a logical device. The logical device may utilize the computing resources of any number of computing devices and thereby provide the functionality of the storage devices (132, 134) described throughout this application. For additional details regarding a storage device (132, 134), see, e.g., FIG. 1C.

While the system of FIG. 1A has been illustrated and described as including a limited number of specific components, a system in accordance with embodiments of the invention may include additional, fewer, and/or different components without departing from the invention.

Figure 1B:
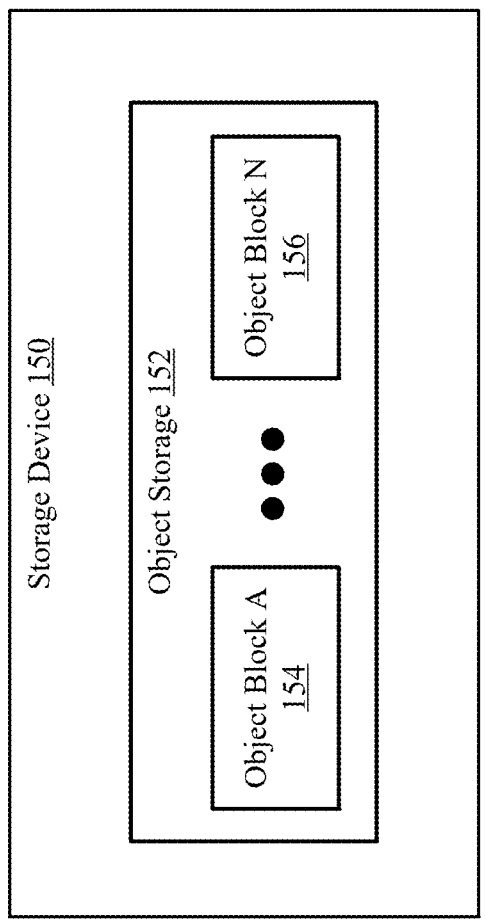
FIG. 1B shows a diagram of a storage device in accordance with one or more embodiments of the invention.

FIG. 1B shows a diagram of a storage device in accordance with one or more embodiments of the invention. The storage device (150) of FIG. 1B may be an embodiment of a storage device (132, 134, FIG. 1A) discussed above. The storage device (150) may include computing resources such as compute resource sets, networking interfaces, and object storage (152) that store one or more object blocks (154, 156). Each object block (154, 156) may include all or a portion of a file system object such as, for example, a file. The storage of an object block (154, 156) in the storage device (150) may be based on the generation and storage of files by the file system servers discussed throughout this disclosure including, for example, the method of FIG. 3B.

Examples of compute resource sets include, but are not limited to, single-core CPUs, multi-core CPUs, graphics processing units (GPUs), and field programmable gate arrays (FPGAs).

In one or more embodiments disclosed herein, the networking interface includes functionality for distributing the storage of data between the object storage (152) and external components (e.g., RDMA fabric devices in the network (120)). The networking interface may access any persistent or non-persistent memory devices of the storage device (150) via one or more compute resources interfaces of the storage device. The compute resources interface may be implemented using any suitable interconnection technology including, for example, system buses such as compute express links or other interconnection protocols. For example, the compute resources interface may be implemented as a peripheral component interconnect express (PCIe) device. The compute resources interface may support any input/output (IO) protocol, any memory protocol, any coherence interface, etc. The compute resources interface may support processor to device connections, processor to memory connections, and/or other types of connections. The compute resources interface may be implemented using one or more hardware devices including circuitry adapted to provide the functionality of the compute resources interface.

The networking interface may be implemented using any suitable interconnection technology including, for example, system buses such as compute express links or other interconnection protocols. The networking interface may support any input/output (IO) protocol, any memory protocol, any coherence interface, etc. The networking interface (166) may support processor to device connections, processor to memory connections, and/or other types of connections. The networking interface may be implemented using one or more hardware devices including circuitry adapted to provide the functionality of the networking interface described herein.

Figure 1C:
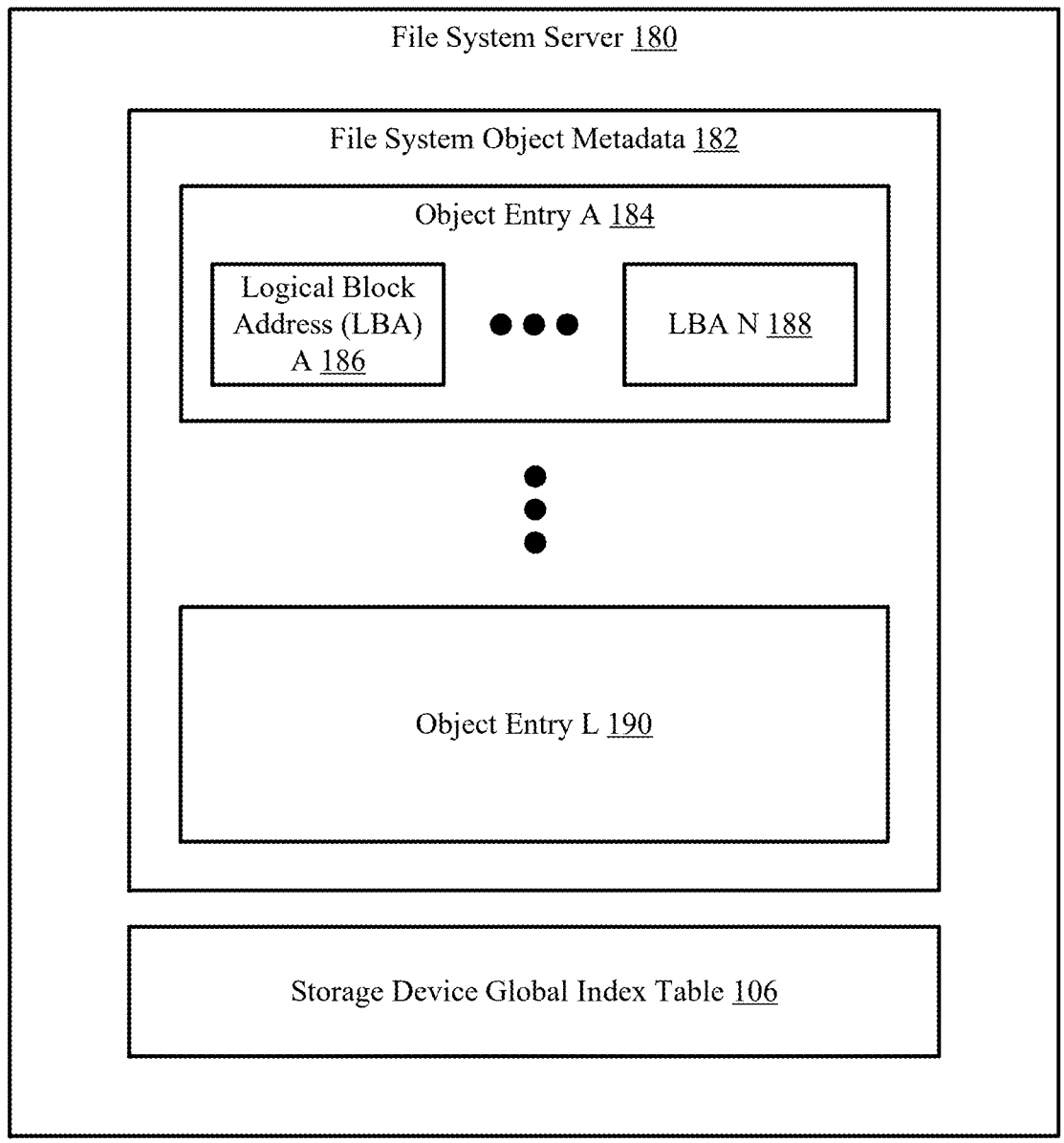
FIG. 1C shows a diagram of a file system server in accordance with one or more embodiments of the invention.

FIG. 1C shows a diagram of a file system server in accordance with one or more embodiments of the invention. The file system server (180) may be an embodiment of one of the file system servers (142, 144, FIG. 1A) discussed above. As discussed above, the file system server (180) manages a portion of the file system objects in a file system. To perform the aforementioned functionality, the file system server (180) may include a file system object metadata (182) and a storage device index table (106) (discussed in FIG. 2B). The file system server (180) may include additional, fewer, and/or different components without departing from the invention. Each of the components illustrated in FIG. 1C is discussed below.

In one or more embodiments, the file system object metadata (182) includes file system object entries (184, 190) (also referred to as "entries") that are each associated with a file system object of a file system. Each entry (184, 190) includes one or more LBAs (186, 188). As discussed above, the LBAs (186, 188) are each a data structure that uniquely identifies a data block of a file system object of a file system. For additional details regarding a LBA, see, e.g., FIG. 2A.

For example, LBA A (186) uniquely identifies a first data block of the file system object, and LBA N (188) uniquely identifies the last data block of the file system object. In one or more embodiments, each of the data blocks of corresponding to the LBAs (186, 188) of an object entry (184) may be of identical or varying sizes, and stored by identical or varying storage devices without departing from the invention.

Figure 2A:
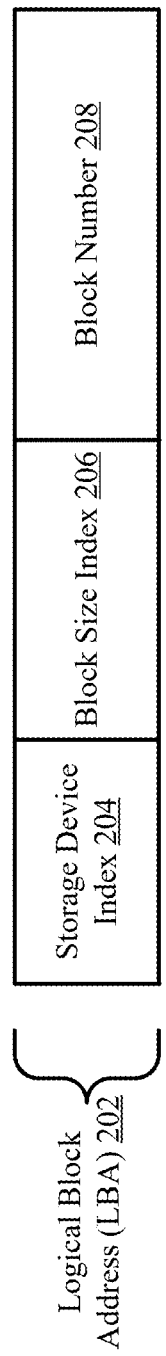
FIG. 2A shows a diagram of a logical block address (LBA) in accordance with one or more embodiments of the invention.

FIG. 2A shows a diagram of a LBA in accordance with one or more embodiments of the invention. The LBA (202) may be an embodiment of LBAs as discussed throughout this disclosure. As discussed above, the LBA (202) uniquely identifies a data block of file system object associated with a file system. The LBA (202) of FIG. 2A includes a field for storage device index (204), a field for a block size index (206), and a field for a block number (208). The LBA (202) may include additional, fewer, and/or different portions of data without departing from the invention.

In one or more embodiments disclosed herein, the storage device index (204) is a portion of data that corresponds to a storage device in which the data block of the LBA (202) is stored. The storage device index (204) may be, for example, a numerical value that is mapped to the storage device using a storage device global index table (106, FIGS. 1A, 1C) discussed throughout this disclosure. An example storage device global index table may be found in FIG. 4C of the Example section. Other information may be indicated in the storage device index (204) without departing from the invention.

In one or more embodiments disclosed herein, the block size index (206) is a portion of data that corresponds to a block size of the data block. The block size index (206) may be, for example, a numerical value that is mapped to a data block size using a block size index table (108, FIG. 1A) discussed above. An example block size index table is provided in FIG. 4B of the Example section. Other information may be indicated in the block size index (206) without departing from the invention.

In one or more embodiments, the block number (208) is a portion of data that corresponds to an assigned block index of a storage device. For example, a storage device may store any number of data blocks. Each data block stored by the storage device may be assigned a block number. Each storage device may utilize a localized assignment of block numbers. The block number assigned to the data block of this LBA (202) by the storage device may be stored in the block number (208) of the LBA (202). Other information may be indicated in the block number (208) without departing from the invention.

Figure 2B:
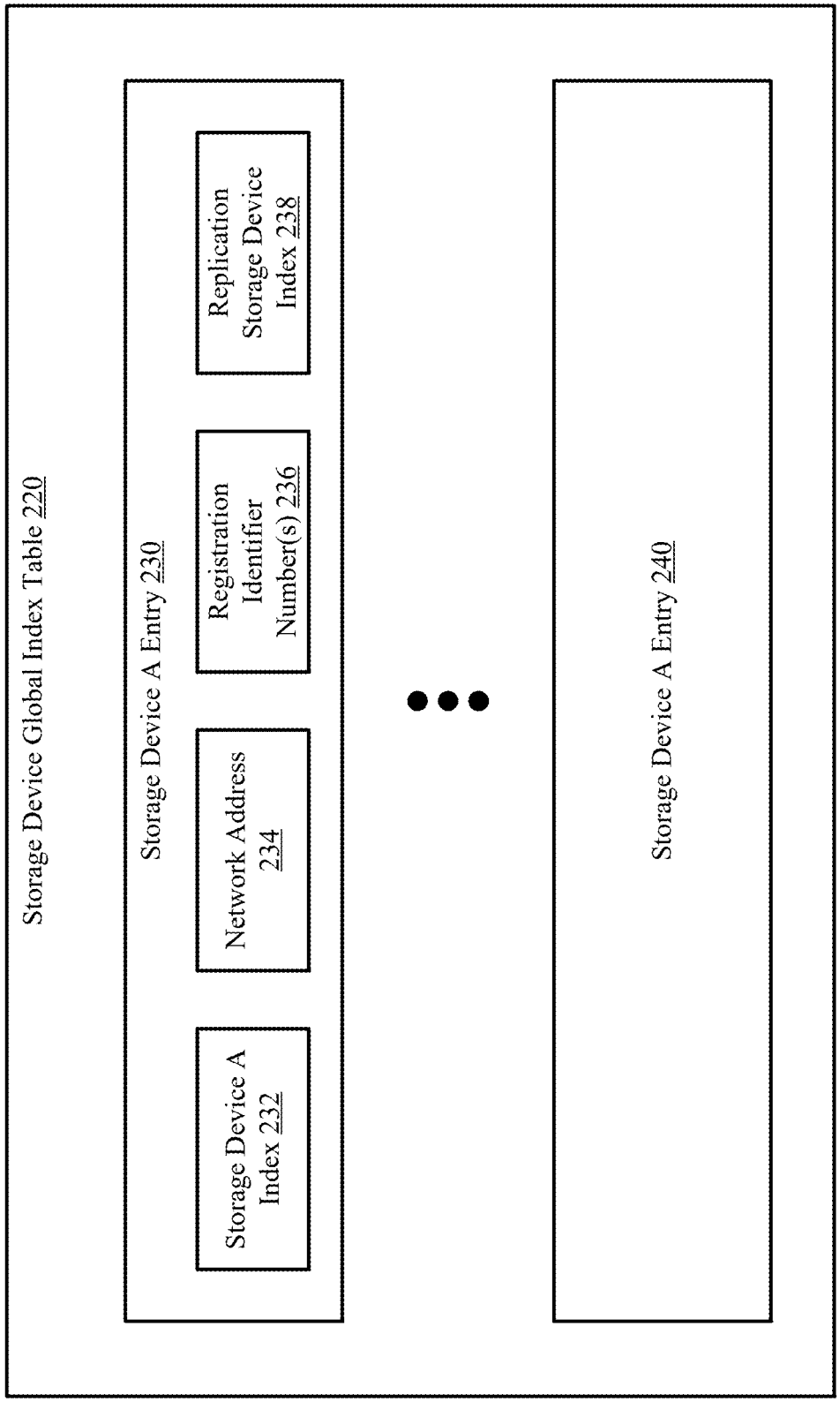
FIG. 2B shows a diagram of a storage device global index table in accordance with one or more embodiments of the invention.

FIG. 2B shows a diagram of a storage device global index table in accordance with one or more embodiments of the invention. The storage device global index table (220) may be an embodiment of the storage device global index table (106, FIGS. 1A and 1C) discussed above. The storage device global index table (220) may include any number of storage device entries (230, 240). Each storage device entry (230) may include a storage device index (232), a network address (234), any number of registration identifier numbers (236), and a replication storage device index (238). Each storage device index (230, 240) may include additional, fewer, and/or different components without departing from the invention.

In one or more embodiments, the storage device index (232) is a portion of data that uniquely identifies a storage device. The storage device index (232) may be used in a LBA (see FIG. 2A) to identify a storage location of the corresponding data block. The storage device index (232) may be mapped to a network address (234) of the storage device. The network address (234) may be, for example, an internet protocol (IP) address. The storage device may be further identified using registration identifier numbers (236) such as unique registration identifiers, unique RDMA memory registered identifiers, or any other identifiers without departing from the invention.

In one or more embodiments, a storage device may replicate the storage of data in a second storage device. For a first storage device that is replicated by a replicated storage device, the storage device entry (230) corresponds to the first storage device, and in such instances in which the first storage device is replicated to the replicated storage device, the storage device entry (230) may include a replication storage device index (238) that includes a storage device index for the replicated storage device. In such instances, the replicated storage device may be used to access data also stored in the first storage device. For additional details about the storage device global index table (220), refer to FIG. 4C.

Figure 3A:
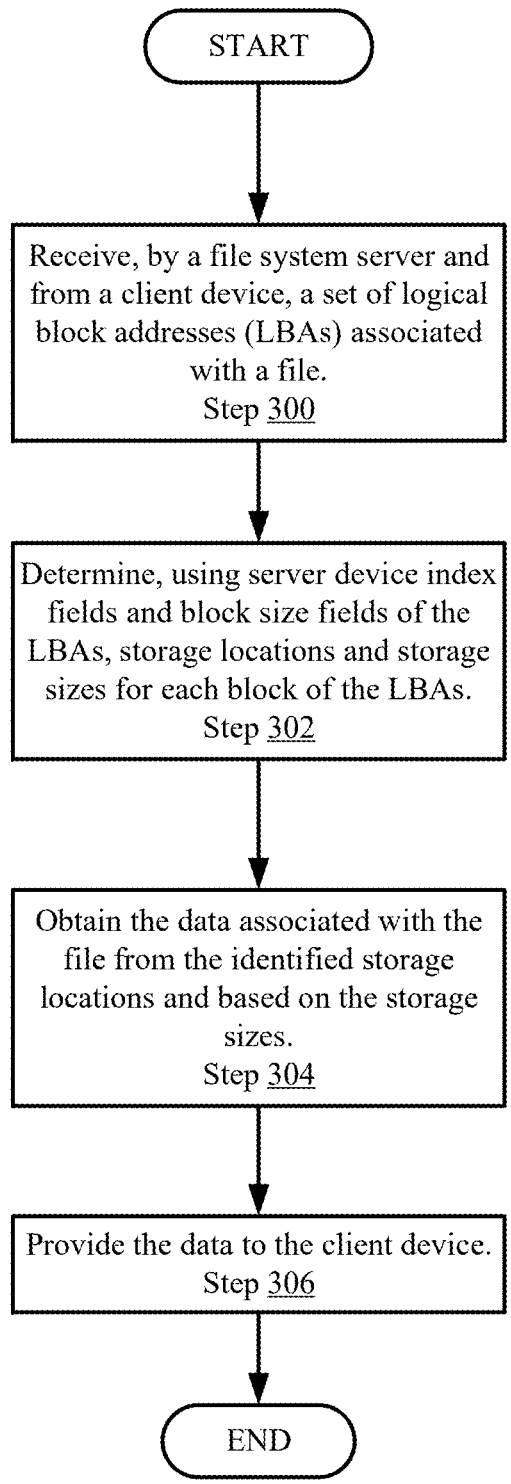
FIG. 3A shows a flowchart for managing requests for accessing files in accordance with one or more embodiments of the invention.

FIG. 3A shows a flowchart for managing requests for accessing files in accordance with one or more embodiments of the invention. The method shown in FIG. 3A may be performed by, for example, a file system server (142, 144, FIG. 1A). Other components of the system illustrated in FIGS. 1A-1C may perform the method of FIG. 3A without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

Turning to the method, in step 300 (FIG. 3A), a set of LBAs associated with a file system object is obtained. In one or more embodiments disclosed herein, the set of LBAs is obtained from a request by a client device to access the file system object. The file system object may be a file comprising data of any size without departing from the invention. Each LBA of the set of LBAs may correspond to a data block of the file.

In step 302, the file system server determines, using a server device index, a block size index, and a block number of the LBA, a storage location and storage size for each of the data blocks of the file system object. For each LBA in the set of LBAs, the file system server identifies a storage location for the corresponding data block by using the storage device index of the LBA and mapping the storage device index to a storage device using a storage device global index table. The file system server (or other entity) uses the block size (with the block size index table) and block number of the LBA to identify the size of the data block and the storage location of the data block in the storage device.

In step 304, the data associated with the file is obtained from the identified storage location(s) and based on the storage sizes. Based on the identified mapped network addresses of the storage devices and the storage locations of the data blocks, the file system server (or other entity) may communicate with the storage devices to obtain the corresponding data blocks from the identified storage devices.

In step 306, the data is provided to the client device. The data may include the data blocks corresponding to the set of LBAs requested from the client device.

While the method of FIG. 3A is discussed as being performed by a file system server, the client device sending the set of LBAs in step 300 may perform steps 302-304 without sending the set of LBAs to the file system server without departing from the invention.

Figure 3B:
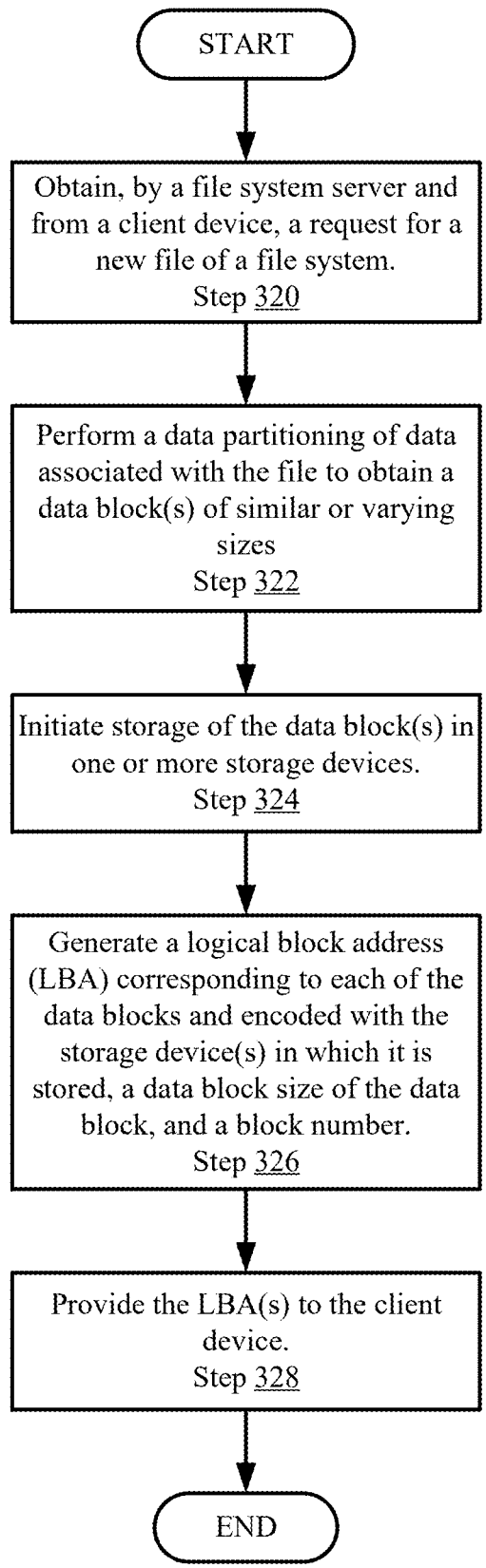
FIG. 3B shows a flowchart for managing requests for storing files in accordance with one or more embodiments of the invention.

FIG. 3B shows a flowchart for managing requests for storing files in accordance with one or more embodiments of the invention. The method shown in FIG. 3B may be performed by, for example, a file system server (142, 144, FIG. 1A). Other components of the system illustrated in FIGS. 1A-1C may perform the method of FIG. 3B without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

Turning to FIG. 3B, in step 320, a request for a new file of a file system is obtained from a client device. The request may include the data of the file to be stored in a storage system.

In step 322, a data partitioning of data associated with the file is performed to obtain one or more data blocks of similar or varying sizes. In one or more embodiments, the data partitioning includes determining a number of data blocks to be generated that collectively comprise the data of the file, and a block size of each of the data blocks. The determination may be based on any factors including, for example: a number of available storage devices in the storage system that may store the data blocks, a bandwidth between the file system server (or other entity transmitting the data) and the storage devices storing the data, a standardized block size of each of the storage devices, a total size of the data, and available storage of the file system server for metadata storage. Other factors may be used to determine a number and block size of the data blocks without departing from the invention.

In one example, in a storage system with a relatively high number of available of storage devices, the data partitioning may determine to partition the data into a high number of data blocks, each stored in one of the storage devices.

In another example, for a storage system with a first storage device with standardized block size of 4 KB and a second storage device without a standard block size, if a file is 5 KB, the data partitioning may include partitioning the data into a first data block of 4 KB, stored in the first storage device, and a second data block of 1 KB, stored in the second storage device.

In another example, for a file system server that prioritizes low storage of metadata corresponding to each file in the file system, the data partitioning may include partitioning the data into a low number of data blocks, with low consideration of the size of the data.

In one or more embodiments, the file system server may consider any combination of the aforementioned factors (or other factors) to perform the data partitioning. The result of the data partitioning may be one or more data blocks.

In step 324, storage of the data block(s) is initiated in one or more storage devices. In one or more embodiments, the file system server determines the storage devices in which to store the partitioned data blocks, and transmits the partitioned data blocks to the determined storage devices (or storage device if it is only one data block) for storage. The file system server may obtain block numbers, from the storage devices, each corresponding to a registered block number of a data block.

In step 326, a logical block address (LBA) is generated for each corresponding data block and encoded with the storage devices in which the corresponding data block is stored, a data block size of the corresponding data block, and a block number registered to the corresponding data block. An example LBA is illustrated in FIG. 2A. Each LBA may uniquely identify one of the partitioned and stored data blocks.

In step 328, the LBA(s) are provided to the client device.

In one or more embodiments, the client device may store the LBAs for future access of the data blocks (e.g., in accordance with the method of FIG. 3A).

Example

The following section describes an example. The example is not intended to limit the invention. The example is described using tables illustrated in FIGS. 4A-4C. Turning to the example, consider a scenario in which a file has data partitioned into eight data blocks and stored throughout a storage system of multiple storage devices.

For the purposes of this example, the terms "LBA" and "data block" may be used interchangeably, as each LBA corresponds to one of file system object in the file system. The interchangeability of these terms may not necessarily apply to the rest of this disclosure outside of this Example section.

The file may be stored by a file system server in accordance with the method of FIG. 3B. Specifically, the file system server applies the data partitioning to the file to generate the eight data blocks, determines a storage location for each of the eight data blocks, and initiates storage of each of the eight data blocks in the determined storage locations. Each storage location is tracked using a storage device index corresponding to a storage device storing the data block and a block number of the storage device registered to the data block. Based on the data partitioning and the storage locations of the eight data blocks, the file system server generates eight logical block addresses (LBAs) that each uniquely identifies one of the eight data blocks.

Turning to FIG. 4A, FIG. 4A shows a first table with eight rows, each corresponding to a data block. Each data block may be identified in the table using a numerical value between 1 and 8. Each data block is associated with a storage device index, a block size index, and block number. Collectively, the storage device index, the block size index, and the block number of a data block comprise a LBA of the data block. The LBA of each data block encodes four bits to specify the storage device index, another five bits to specify the block size index, and another 32 bits to specify the block number. As such, the four bits of the storage device index may be used to map up to $2^4$ (or 16) storage devices of a storage system, the five bits of the block size index may be used to map up to $2^5$ (or 32) different block sizes, and the 64 bits of the block numbers may be used to map up to $2^{32}$ (or about 4.3 billion) block numbers of each of the 16 storage device. Using this encoding, a maximum of $2^4*2^{32}$ (or about 68 billion) data blocks (each represented by a unique LBA) may be represented in the storage system.

To clarify the above representation of a data block, a LBA of data block 1 is encoded with 41 bits: the first four bits represent the storage device index of 0, the next five bits represent the block size index of 6, and the remaining 32 bits represent block number 2934. A file system server or client device that wishes to access data block 1 may be use this LBA to locate data block 1.

The entity accessing data block 1 may further use a block size index table to map the block size index to a size of the data block. FIG. 4B shows an example block size index table. As partially shown in FIG. 4B, each of the 32 (i.e., 0-31) possible block size indices is mapped to a defined block size. The example block size index table of FIG. 4B maps the block size index of 6 to 256K. This represents a block size of 256 KB for data block 1. Using another example, data block 8 is illustrated in FIG. 4A as being associated with a block size index of 0. The block size index table of FIG. 4B maps the block size index of 0 to 4K, indicating a size of 4 KB for data block 8.

In addition to the block size index table of FIG. 4B, the entity accessing a data block may further use a storage device global index table to map the storage device indices to storage devices. FIG. 4C shows an example storage device global index table. As partially shown in FIG. 4C, each of the 16 (i.e., 0-15) possible storage device indices is mapped to an IP address of a storage device, a RDMA registered identifier for accessing memory of the storage device, a unique registration identifier, and a replication storage device index. The example storage device global index table of FIG. 4C maps the storage device index of 0 to a first storage device with IP address of 10.1.1.31. As such, data block 1 (as with any data blocks with a LBA indicating a storage device index of 0) is stored in the first storage device and accessible using the corresponding IP address, RDMA registered identifier, or unique registration identifier. Further, in the event that the first storage device is not available to provide a data block, the entity attempting to access a data block stored in the first storage device (i.e., the storage device associated with storage device index 0), the entity may use a second storage device corresponding to the specified replication storage device index. In this example, the second storage device is associated with storage device index 7. In the storage device global index table of FIG. 4C, storage device index 7 maps to an IP address of 10.1.1.73.

Consider another data block as an example: data block 4, as illustrated in FIG. 4A, is associated with a storage device index of 1, a block size index of 6, and a block number of 33356. Using the storage device global index table of FIG. 4C, data block 4 may be accessed using the IP address mapped to the storage device index of 1 (i.e., 10.1.1.12) and using the block number of 33356 of this storage device. Further, using the block size index table of FIG. 4B, the data block is determined to be of a size mapped to block size index of 6 (i.e., 256 KB).

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the storage of files in a file system with a large variance of sizes. For large files, a large number of data blocks may be used to store the file. Conversely, for smaller files, fewer data blocks may be used.

The ability to define varying block sizes in LBAs may further enable dynamic data partitioning of file data based on the storage availability of a storage system. For example, for a storage system with a large number of available storage devices, it may be more beneficial to partition a file into a large number of small-sized data blocks. Conversely, for storage systems with a relatively low number of available storage devices, the data may be partitioned into a small number of relatively larger-sized data blocks. The data block sizes and storage locations may be similar or varying for each data block. Such data block sizes and storage locations may be encoded in the corresponding LBAs and used by client devices to access the corresponding data.

By encoding LBAs in accordance with one or more embodiments of the invention, the storage location and block size of each data block is encoded in the metadata used to uniquely identify the data block. As such, the requirement for additional metadata to locate the data block is reduced. This may improve the overall efficiency of accessing data for a file system.

Thus, embodiments of the invention may address the problem of inefficient use of computing resources. This problem arises due to the technological nature of the environment in which file systems are utilized.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A system for managing a file system, comprising:
a file system server comprising a processor;
a plurality of storage devices comprising a storage device;
a client device; and
wherein the storage device, the client device, and the file system server are operatively connected via a network,
wherein the file system server comprises computer readable instructions, which when executed by the processor, enable the file system server to perform a method, the method comprising:
receiving a request for a file system object from the client device via the network, wherein the request comprises a logical block address (LBA) associated with a data block of the file system object;
in response to the request:
determining a storage location of the data block using the LBA;

obtaining, from the storage location of the storage device via the network, data associated with the data block; and sending the data to the client device, wherein the LBA comprises:
- a storage device index corresponding to the storage device,
- a block size index corresponding to a size of the data block, and
- a block number corresponding to a block index of a plurality of data blocks stored in the storage device.

2. The system of claim 1, wherein the request comprises a second LBA associated with a second data block of the file system object, and wherein the file system object corresponds to a file comprising the data block and the second data block.

3. The system of claim 2, wherein the method further comprises:

determining a second storage location of the second data block using the second LBA;

obtaining, from the second storage location of a second storage device of the plurality of storage devices, second data associated with the second data block; and sending the second data to the client device.

4. The system of claim 3, wherein the second LBA comprises:
- a second storage device index corresponding to the second storage device,
- a second block size index corresponding to a size of the second data block, and
- a second block number corresponding to a block index of a second plurality of data blocks stored in the second storage device, wherein the size of the second data block is different from the size of the data block.

5. The system of claim 1, wherein the storage device comprises a plurality of memory devices, and wherein the data is stored on a memory device of the plurality of memory devices.

6. The system of claim 5, wherein the file system server obtains the data using a remote direct memory access (RDMA) fabric provided via the network.

7. The system of claim 1, wherein the file system server comprises a storage device global index table, and wherein the storage device global index table maps the storage device index to a network address of the storage device in the network.

8. The system of claim 7, wherein the storage device global index table further maps a server base index field to a second network address of a redundant storage device of the plurality of storage devices.

9. A method for managing a file system, comprising:

receiving, by a file system server and from a client device, a request for a file system object, wherein the request comprises a logical block address (LBA) associated with a data block of the file system object, wherein the LBA comprises:
- a storage device index corresponding to a storage device of a plurality of storage devices,
- a block size index corresponding to a size of the data block, and
- a block number corresponding to a block index of a plurality of data blocks stored in the storage device;

in response to the request:

determining a storage location of the data block using the LBA;

obtaining, from the storage location of the storage device via a network, data associated with the data block; and sending the data to the client device.

10. The method of claim 9, wherein the request comprises a second LBA associated with a second data block of the file system object, and wherein the file system object corresponds to a file comprising the data block and the second data block.

11. The method of claim 10, further comprising:

determining a second storage location of the second data block using the second LBA;

obtaining, from the second storage location of a second storage device of the plurality of storage devices, second data associated with the second data block; and sending the second data to the client device.

12. The method of claim 11, wherein the second LBA comprises:
- a second storage device index corresponding to the second storage device,
- a second block size index corresponding to a size of the second data block, and
- a second block number corresponding to a block index of a second plurality of data blocks stored in the second storage device, wherein the size of the second data block is different from the size of the data block.

13. The method of claim 9, wherein the storage device comprises a plurality of memory devices, and wherein the data is stored on a memory device of the plurality of memory devices.

14. The method of claim 13, wherein the file system server obtains the data using a remote direct memory access (RDMA) fabric provided via the network.

15. The method of claim 9, wherein the file system server comprises a storage device global index table, and wherein the storage device global index table maps the storage device index to a network address of the storage device in the network.

16. The method of claim 15, wherein the storage device global index table further maps a server base index field to a second network address of a redundant storage device of the plurality of storage devices.

17. A non-transitory computer readable medium comprising computer readable program code, which when executed by a computer processor enables the computer processor to perform a method for managing a file system, comprising:

receiving, by a file system server and from a client device, a request for a file system object, wherein the request comprises a logical block address (LBA) associated with a data block of the file system object, wherein the LBA comprises:
- a storage device index corresponding to a storage device of a plurality of storage devices,
- a block size index corresponding to a size of the data block, and
- a block number corresponding to a block index of a plurality of data blocks stored in the storage device;

in response to the request:

determining a storage location of the data block using the LBA;

obtaining, from the storage location of the storage device via a network, the data associated with the data block; and sending the data to the client device.

18. The non-transitory computer readable medium of claim 17,
wherein the request comprises a second LBA associated with a second data block of the file system object, and
wherein the file system object corresponds to a file comprising the data block and the second data block.

19. The non-transitory computer readable medium of claim 18, wherein the method further comprises:
determining a second storage location of the second data block using the second LBA;
obtaining, from the second storage location of a second storage device of the plurality of storage devices, second data associated with the second data block; and
sending the second data to the client device.

20. The non-transitory computer readable medium of claim 19,
wherein the second LBA comprises:
a second storage device index corresponding to the second storage device,
a second block size index corresponding to a size of the second data block, and
a second block number corresponding to a block index of a second plurality of data blocks stored in the second storage device,
wherein the size of the second data block is different from the size of the data block.

* * * * *